(12) United States Patent
Nishimura et al.

(10) Patent No.: US 11,609,722 B2
(45) Date of Patent: Mar. 21, 2023

(54) STORAGE MEDIUM AND TRANSMISSION DEVICE FOR TRANSMITTING A FILE DETERMINED TO BE IN A CORRECT FILE FORMAT

(71) Applicant: SEIKO EPSON CORPORATION, Tokyo (JP)

(72) Inventors: Haruka Nishimura, Okaya (JP); Yusuke Yamada, Shiojiri (JP); Shigeo Tajima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/447,725

(22) Filed: Sep. 15, 2021

(65) Prior Publication Data
US 2022/0083287 A1    Mar. 17, 2022

(30) Foreign Application Priority Data
Sep. 15, 2020    (JP) .............................. JP2020-154425

(51) Int. Cl.
*G06F 3/12*    (2006.01)
*G06F 3/04817*    (2022.01)
*G06F 3/0482*    (2013.01)

(52) U.S. Cl.
CPC .......... *G06F 3/1206* (2013.01); *G06F 3/0482* (2013.01); *G06F 3/04817* (2013.01); *G06F 3/1208* (2013.01); *G06F 3/1225* (2013.01); *G06F 3/1292* (2013.01)

(58) Field of Classification Search
CPC ..................................................... G06F 3/1206
USPC ........................................................ 358/1.15
See application file for complete search history.

(56) References Cited

U.S. PATENT DOCUMENTS

| 2011/0069344 | A1  | 3/2011 | Yokomizo |
| 2015/0146245 | A1* | 5/2015 | Asai ..................... G06F 3/1288 358/1.15 |
| 2016/0274843 | A1* | 9/2016 | Kumagai ............... G06F 3/1245 |
| 2020/0104080 | A1* | 4/2020 | Maruyama ............ G06F 3/1247 |

FOREIGN PATENT DOCUMENTS

| JP | 2006-119814 A | 5/2006 |
| JP | 2011-065595 A | 3/2011 |
| JP | 2017-151851 A | 8/2017 |

* cited by examiner

*Primary Examiner* — Jacky X Zheng
(74) *Attorney, Agent, or Firm* — Workman Nydegger (57) ABSTRACT

When a file is selected, a user PC control section of a user PC determines whether or not a format of the file selected is a first file format, and when it is determined that the file format of the file is a first file format, the file is transmitted to a server device, and when it is determined that the file format of the file is a second file format different from the first file format, a printer driver is caused to convert the file in the second file format into the file in the first file format, and the file converted in the first file format is transmitted to the server device.

14 Claims, 4 Drawing Sheets

STORAGE MEDIUM AND TRANSMISSION DEVICE FOR TRANSMITTING A FILE DETERMINED TO BE IN A CORRECT FILE FORMAT

The present application is based on, and claims priority from JP Application Serial Number 2020-154425, filed Sep. 15, 2020, the disclosure of which is hereby incorporated by reference herein in its entirety.

BACKGROUND

1. Technical Field

The present disclosure relates to a storage medium storing a program and a transmission device.

2. Related Art

Up to now, a technique has been proposed in which when a file is transferred to an information processing apparatus, the file is converted into a file in a format that can be processed by the information processing apparatus, and the converted file is transmitted to the information processing apparatus.

For example, JP-A-2011-65595 discusses an information processing apparatus that transmits a file for forming an image to an image forming apparatus, and when a format of the file is a format that is not to be interpreted by the image forming apparatus, the information processing apparatus converts the file into a file in a format that can be interpreted by the image forming apparatus. The information processing apparatus transmits the file after the format conversion to the image forming apparatus.

However, according to JP-A-2011-65595, since the information processing apparatus converts data into data in a format that can be processed by the image forming apparatus, the information processing apparatus needs to store a processable data format for each model of the image forming apparatus in advance.

SUMMARY

According to an aspect of the present disclosure, there is provided a non-transitory computer-readable storage medium storing a program executed by a computer of a transmission device that transmits a file to a server device with an information processing apparatus set as a transmission destination and that is provided with a printer driver operating therein, the program causing the computer to execute: determining, when the file is selected, whether or not a file format of the file selected is a first file format; transmitting the file to the server device when it is determined that the file format of the file selected is the first file format; and causing, when it is determined that the file format of the file selected is a second file format different from the first file format, the printer driver to convert the file in the second file format into the file in the first file format, and transmitting the file converted in the first file format to the server device.

According to an aspect of the present disclosure, there is provided a transmission device that transmits a file to a server device with an information processing apparatus set as a transmission destination and that is provided with a printer driver operating therein, the transmission device including: an acceptance section configured to receive an operation signal indicating that the file is selected; a determination section configured to determine whether or not a file format of the file selected is a first file format; a conversion section configured to convert, when the determination section determines that the file format of the file is a second file format different from the first file format, the file in the second file format into the file in the first file format; and a communication control section configured to transmit, when the determination section determines that the file is in the first file format, the file and information on the transmission destination to the server device, and transmit, when the determination section determines that the file format of the file is the second file format, the file converted in the first file format and the information on the transmission destination to the server device.

DESCRIPTION OF EXEMPLARY EMBODIMENTS

Figure 1:
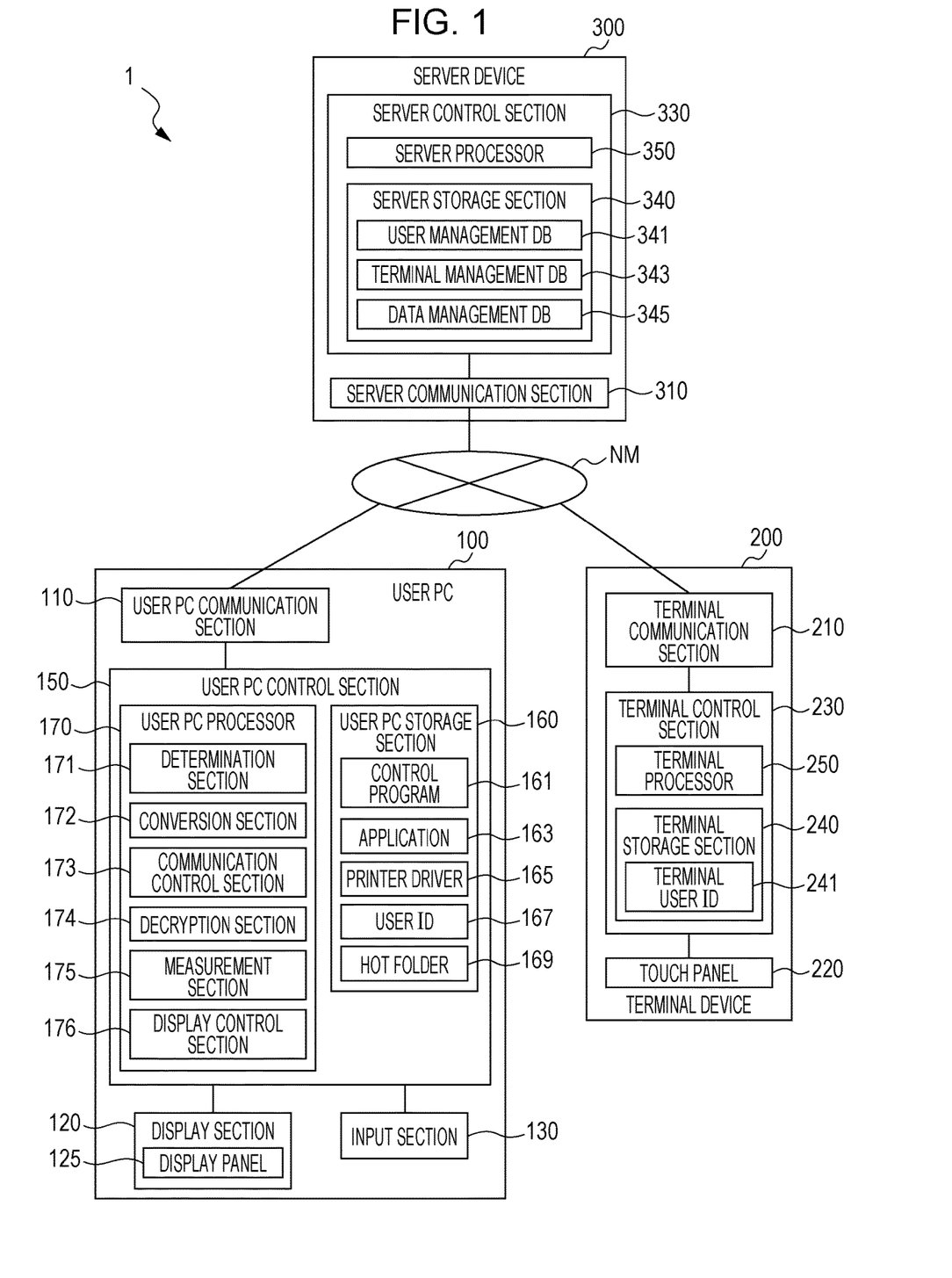
FIG. 1 is a diagram illustrating a system configuration.

FIG. 1 is a diagram illustrating a system configuration according to the present embodiment.

The system 1 includes a user personal computer 100 and a terminal device 200 which are possessed by a user of the system 1, and a server device 300. Hereinafter, the personal computer is abbreviated as a PC.

The user PC 100 and the terminal device 200 may be devices possessed or used by the same user, or may be devices possessed or used by different users.

The user PC 100, the terminal device 200, and the server device 300 are connected to a network NW. The network NW is constructed by the Internet, a dedicated communication line, a mobile communication network including a base station, a gateway, and the like. The dedicated communication line includes a community antenna television (CATV) line and the like.

The user PC 100 corresponds to a transmission device that transmits data to the terminal device 200 as a transmission destination via the server device 300. The user PC 100 includes a desktop PC, a laptop PC, a tablet PC, or the like. The user PC 100 includes a user PC communication section 110, a display section 120, an input section 130, and a user PC control section 150.

The user PC communication section 110 is a PC communication interface having a communication function for performing wired or wireless communication, and performs data communication with the server device 300 via the network NW.

The display section 120 is a display including a display panel 125 such as a liquid crystal panel or an organic electro-luminescence (EL) panel. The display section 120 displays an image corresponding to display data input from the user PC control section 150 on the display panel 125. The display section 120 may be an external device coupled to the user PC 100.

The input section 130 corresponds to an example of an acceptance section, and is an input interface that receives a signal corresponding to a user's operation by an input device such as a coupled mouse or keyboard and outputs the signal to the user PC control section 150. The user PC control section 150 executes a process corresponding to the input signal. An example of the user is a user of the system 1.

The user PC control section 150 includes a user PC storage section 160 and a user PC processor 170, and controls the respective sections of the user PC 100.

The user PC storage section 160 is a non-volatile memory. The non-volatile memory includes a semiconductor memory such as a read-only memory (ROM), a flash memory, or an electrically erasable programmable read-only memory (EEPROM). The user PC storage section 160 may adopt a configuration including a volatile memory such as a random-access memory (RAM). The volatile memory is used as a calculation area of the user PC processor 170. The non-volatile memory may also include an auxiliary storage device such as a hard disk drive (HDD) or a solid-state drive (SSD).

The user PC storage section 160 stores an operating system (OS) (not illustrated) executed by the user PC processor 170, a control program 161, an application program 163, a printer driver 165, and a user ID 167. Hereinafter, the application program 163 is abbreviated as the application 163. The control program 161 that causes the user PC control section 150 to operate as a determination section 171, a conversion section 172, and a communication control section 173 which will be described below corresponds to an example of a program. The program may have a function of causing the user PC control section 150 to operate as a decryption section 174, a measurement section 175, and a display control section 176 which will be described below. The control program 161 may have some or all of the functions of the printer driver 165.

The application 163 is office software that creates a document file such as a Word file, an Excel file, or a PowerPoint file in accordance with the user's operation.

The printer driver 165 is driver software for a printer (not illustrated) coupled to the user PC 100. The user PC processor 170 executes the printer driver 165. As a result of the operation by the user PC processor 170, the document file is converted into data in a format that can be printed by the printer. The converted data is output to the printer.

The user ID 167 is identification information for identifying the user of the system 1. The user ID 167 is assigned to the user who uses the system 1. The user PC 100 is connected to the server device 300 in advance, and the user ID 167 is assigned.

A hot folder 169 is formed in the user PC storage section 160. The hot folder 169 is monitored by the user PC control section 150, and a file stored in the hot folder 169 or a processed file obtained by processing a file stored by the user PC control section 150 with predetermined processing contents is transmitted to the server device 300. The processing contents are processing executed by any of the determination section 171, the conversion section 172, the communication control section 173, the decryption section 174, and the measurement section 175 which will be described below.

The user PC processor 170 includes a central processing unit (CPU) or a microcomputer such as a micro controller unit (MCU) or microprocessor unit (MPU) equipped with the CPU. The user PC control section 150 may include an integrated circuit such as an application-specific integrated circuit (ASIC) or a field-programmable gate array (FPGA).

The user PC control section 150 includes, as functional blocks, the determination section 171, the conversion section 172, the communication control section 173, the decryption section 174, the measurement section 175, and the display control section 176. These functional blocks represent functions of the user PC control section 150 realized by the user PC processor 170 executing the control program 161 stored in the user PC storage section 160.

The determination section 171 is a functional block that executes processing corresponding to a determination procedure. When an operation signal indicating selection of a file is input as a signal input by the input section 130, the determination section 171 starts processing on the file selected by the operation signal.

The user's operation for outputting the operation signal includes a process of saving a file in the hot folder 169 and a selection operation by the user for selecting "view on terminal" on a menu included in a context menu 190 described below. The selection operation by the user for selecting the item "view on terminal" corresponds to a transmission instruction for transmission to the information processing apparatus as a transmission destination. The context menu 190 corresponds to an example of the menu.

The determination section 171 determines, as a setting condition, whether or not a file stored in the hot folder 169 or a file selected by the user's operation is in a first file format.

The setting condition is a condition of a file to be transmitted to the server device 300, and the setting condition is that an extension indicating a file format is Portable Document Format (PDF). The extension PDF indicates that the file format is the PDF format. The PDF format corresponds to the first file format. The determination section 171 refers to the file extension and determines that the file format is the first file format when the file extension is PDF. When the file extension is other than PDF, the determination section 171 determines that the file format is a second file format.

The setting condition may be that the extension of the file is PDF and a size of the file is smaller than a predetermined size.

The predetermined size may be a predetermined value set in advance or may be a value set based on a communication speed of a communication path which is measured by the measurement section 175. An allowable time for transferring the file to the server device 300 is set in advance, and the predetermined size is decided as the size of the file transmittable within the allowable time based on the measured communication speed.

When the extension of the file is PDF and the size of the file is smaller than the predetermined size decided based on the communication speed, the determination section 171 determines that the file is image data that satisfies the setting condition. When the extension of the file is PDF and the file size is equal to or larger than the predetermined size, the determination section 171 determines that the file is not the image data that satisfies the setting condition.

The conversion section 172 is a functional block that executes processing corresponding to a conversion procedure. The conversion section 172 converts a format of the file where the determination section 171 determines that the file is not the image data that satisfies the setting condition. The conversion section 172 converts a file format whose file extension is not PDF into a PDF format file. The conversion section 172 generates a reduced image of the file where the determination section 171 determines that the size of the file is equal to or larger than a predetermined size. The conversion section 172 generates one or more pieces of thumbnail image data having a size equal to or smaller than a predetermined size as reduced images. The conversion section 172 may be a function operating by being executed by the printer driver 165.

The communication control section 173 controls the user PC communication section 110 to transmit the file to the server device 300. The communication control section 173 executes a first transmission procedure of transmitting, to the server device 300, the file whose extension is determined as PDF by the determination section 171. The communication control section 173 executes a second transmission procedure of transmitting, to the server device 300, the file converted into the PDF format by the conversion section 172.

When one or more pieces of the thumbnail image data are generated by the conversion section 172, the communication control section 173 transmits the one or more pieces of the thumbnail image data generated by the conversion section 172 to the server device 300 before transmitting the file in the PDF format to the server device 300. After the transmission of the thumbnail image data is completed, the communication control section 173 transmits the PDF file to the server device 300.

The decryption section 174 is a functional block that executes processing corresponding to a decryption procedure. When the file selected by the user's operation is an encrypted file, the decryption section 174 decrypts the encryption of the file by using an input password as the signal input to the input section 130. When a password is set in the file, the determination section 171 determines that the file is an encrypted file.

The measurement section 175 is a functional block that executes processing corresponding to a measurement procedure. The measurement section 175 measures a communication speed of a communication path connecting the user PC 100 and the server device 300. The measurement section 175 measures a communication speed by using a ping command. The measurement section 175 outputs the measured communication speed to the determination section 171.

The display control section 176 is a functional block that executes processing corresponding to a display procedure. The display control section 176 generates display data to be displayed at the display section 120 and outputs the generated display data to the display section 120. The display section 120 displays an image corresponding to the input display data on the display panel 125. The display section 176 outputs a file icon 180 and the context menu 190, which will be described below, as display data to be displayed on the display panel 125.

Figure 2:
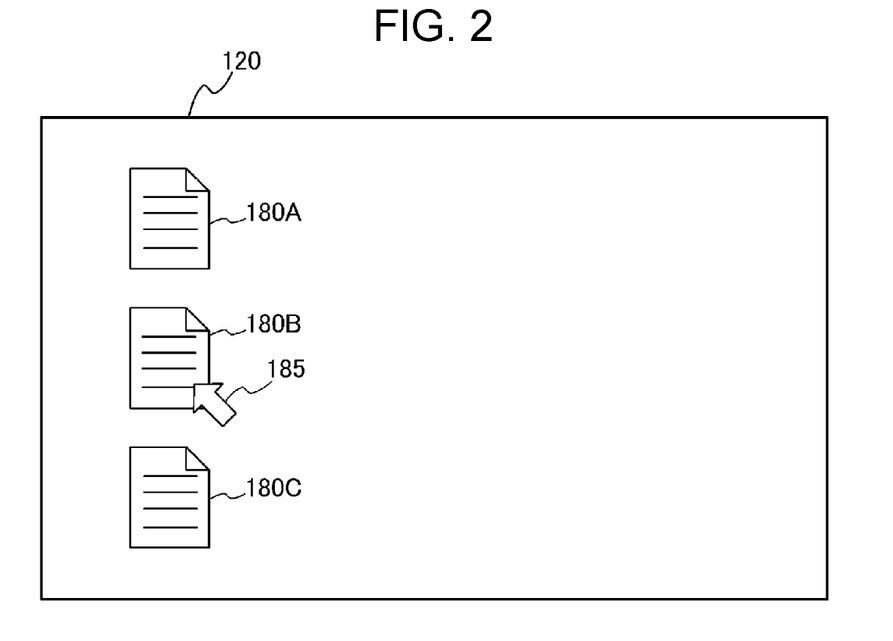
FIG. 2 is a diagram illustrating an example of an image displayed on a display panel.
Figure 3:
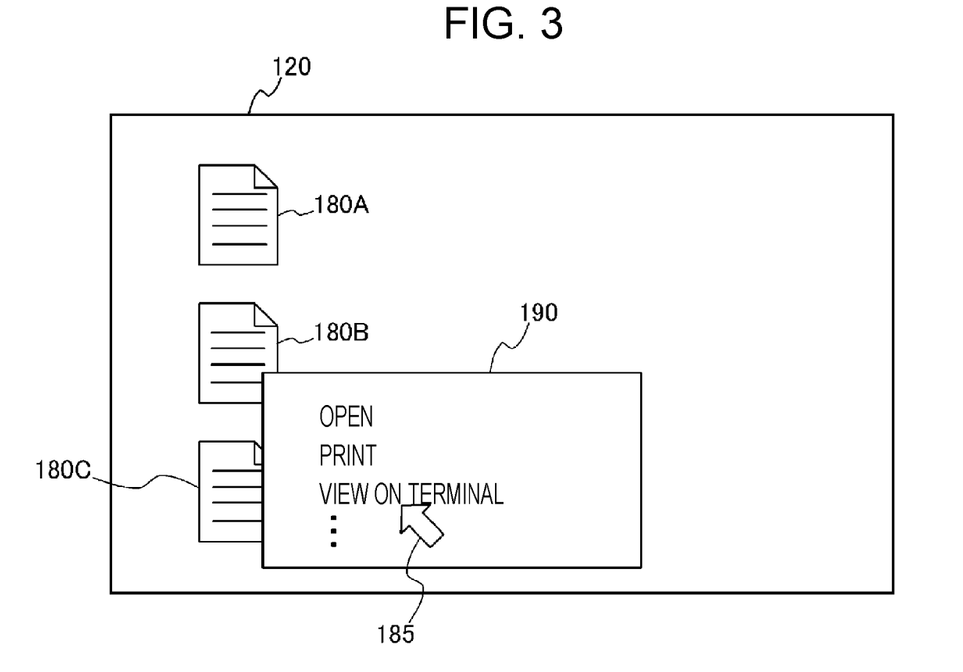
FIG. 3 is a diagram illustrating an example of the image displayed on the display panel.

FIG. 2 and FIG. 3 are diagrams illustrating examples of images displayed on the display panel 125.

FIG. 2 is a diagram illustrating the display panel 125 on which a first file icon 180A, a second file icon 180B, and a third file icon 180C indicating files are displayed. Hereinafter, when the first file icon 180A, the second file icon 180B, and the third file icon 180C are described without being distinguished from one another, those icons are referred to as a file icon 180 or file icons 180.

When the cursor 185 overlaps any of display positions of the first file icon 180A, the second file icon 180B, and the third file icon 180C displayed on the display panel 125 by the user's operation and the user's operation for right-clicking the mouse is input, the display control section 176 displays the context menu 190.

FIG. 3 is a diagram illustrating the context menu 190 displayed when the second file icon 180B is selected from among the first file icon 180A, the second file icon 180B, and the third file icon 180C and the user's operation for right-clicking the mouse is input. The context menu 190 includes "view on terminal" indicating processing for viewing a file on the terminal device 200. The terminal indicates the terminal device 200.

When the user's operation for selecting the item "view on terminal" is input, the user PC control section 150 starts processing by the determination section 171, the communication control section 173, and the decryption section 174, or the determination section 171, the conversion section 172, the communication control section 173, and the decryption section 174.

The user PC control section 150 starts processing for a file saved in the hot folder 169.

The terminal device 200 will be described. The terminal device 200 corresponds to an information processing apparatus.

The terminal device 200 is a portable terminal such as a smartphone, a tablet PC, or a laptop PC. The terminal device 200 is a terminal possessed by the user or a terminal lent to the user by a company to which the user belongs.

The terminal device 200 includes a terminal communication section 210, a touch panel 220, and a terminal control section 230.

The terminal communication section 210 has a communication function for performing wireless communication, and performs data communication with the server device 300 via the network NW including a mobile communication network.

The touch panel 220 includes a display device such as a liquid crystal display panel and a touch sensor provided to overlap or be integrated with the display device. The touch panel 220 displays various images under the control of the terminal control section 230. The touch sensor detects an operation position of a touch operation and outputs coordinate information indicating the detected operation position to the terminal control section 230. The terminal control section 230 determines the touch operation based on the input coordinate information, and executes processing corresponding to the determined touch operation.

The terminal control section 230 includes a terminal processor 250 that is a processor such as a CPU or an MPU that executes a program and a terminal storage section 240, and controls each section of the terminal device 200. In the terminal control section 230, the terminal processor 250 reads a program stored in the terminal storage section 240 to execute a process, and executes various processes by hardware and software.

The terminal storage section 240 has a storage area for storing programs executed by the terminal processor 250 and data processed by the terminal processor 250. The terminal storage section 240 stores a terminal user ID 241 for identifying a terminal user.

The server device 300 will be described.

The server device 300 includes a server communication section 310 and a server control section 330.

The server communication section 310 is a communication interface, and mutually performs data communication with a device connected to the network NW according to a predetermined communication standard. The server communication section 310 communicates with the user PC 100 and the terminal device 200.

The server control section 330 includes a server processor 350 that is a processor such as a CPU or an MPU that executes a program and a server storage section 340, and controls each section of the server device 300. In the server control section 330, the server processor 350 reads a program stored in the server storage section 340 to execute a process, and executes various processes by hardware and software.

The server storage section 340 stores programs executed by the server processor 350 and data processed by the server processor 350.

The server storage section 340 stores a user management database 341, a terminal management database 343, and a data management database 345. Hereinafter, the database is referred to as a DB.

The user management DB 341 is a database that manages users of the system 1. One record of the user management DB 341 includes personal information indicating the user of the system 1, such as a name, an age, a sex, and an address of the user, the user ID 167 assigned to the user, and the password.

The terminal management DB 343 is a database that manages the terminal device 200 permitted to refer to or download files registered in the server device 300. A registrant who registers a file in the server device 300 may be the same as or different from a referrer who is permitted to refer to or download the file registered in the server device 300.

A transmission source user ID, a transmission destination user ID, and communication information are associated with one record of the terminal management DB 343. The transmission source user ID identifies the registrant who registers the file in the server device 300. The transmission destination user ID identifies the referrer who is permitted to refer to or download the file. The communication information is address information used when information is transmitted to the referrer of the transmission destination user ID. A mail address of the registrant of the transmission destination user ID is used as the communication information. The communication information may be a media access control (MAC) address of the terminal device 200.

The data management DB 345 stores the file transmitted from the user PC 100.

One record of the data management DB 345 includes the user ID 167 and a file. The file is a file in the PDF format.

The server control section 330 stores the file received from the user PC 100 in the data management DB 345. After the storage of the file in the data management DB 345 is completed and the file is ready to be transmitted to the terminal device 200, the server control section 330 refers to the terminal management DB 343 and acquires the transmission destination user ID associated with the transmission source user ID and the communication information. The server control section 330 determines with reference to the user management DB 341 whether or not the transmission source user ID is the user ID 167 of the user of the system 1 who has transmitted the file to the server device 300 by using the user PC 100. When the transmission source user ID matches the user ID 167 of the user of the system 1, the server control section 330 determines that the registrant is the user of the system 1 and acquires the communication information. The server control section 330 outputs an acquirable notification indicating a state in which a file can be acquired to the acquired communication information. The acquirable notification includes a Uniform Resource Locator (URL) indicating an address of the data management DB 345 in which the file is stored.

The terminal control section 230 receives the acquirable notification from the server device 300, and causes the touch panel 220 to display the received acquirable notification by a touch operation of the terminal user.

When the URL of the acquirable notification displayed on the touch panel 220 is selected, the terminal control section 230 establishes connection with the server device 300.

The server control section 330 accepts an access from the terminal device 200, and requests the terminal device 200, from which the server control section 330 has accepted the access, for inputs of the terminal user ID 241 and the password to perform user authentication. The server control section 330 receives the terminal user ID 241 and the password from the terminal device 200, and determines whether or not the terminal user ID 241 matches the transmission destination ID stored in the terminal management DB 343. When it is determined that the transmission destination user ID matches the terminal user ID 241 and the password stored in the user management DB 341 matches the input password, the server control section 330 authenticates the referrer as the user. After the user authentication is successful, the server control section 330 permits the display of the file specified by the URL on the touch panel 220. The server control section 330 accepts a file download request from the terminal device 200, and permits the terminal device 200 to download the file.

In the above description, when the acquirable notification is transmitted to the terminal device 200 and an access to the URL included in the acquirable notification is accepted, the server device 300 permits the touch panel 220 of the terminal device 200 to display the file. As another operation, the server control section 330 acquires the communication information associated with the transmission destination user ID by referring to the terminal management DB 343 when the storage of the file in the data management DB 345 is completed and the file can be transmitted to the terminal device 200. The communication information to be acquired is the MAC address of the terminal device 200. The server control section 330 may acquire the MAC address as the communication information and transmit the file to the acquired MAC address. The user PC 100 transmits data to the server device 300 by setting the terminal device 200 as the transmission destination.

Figure 4:
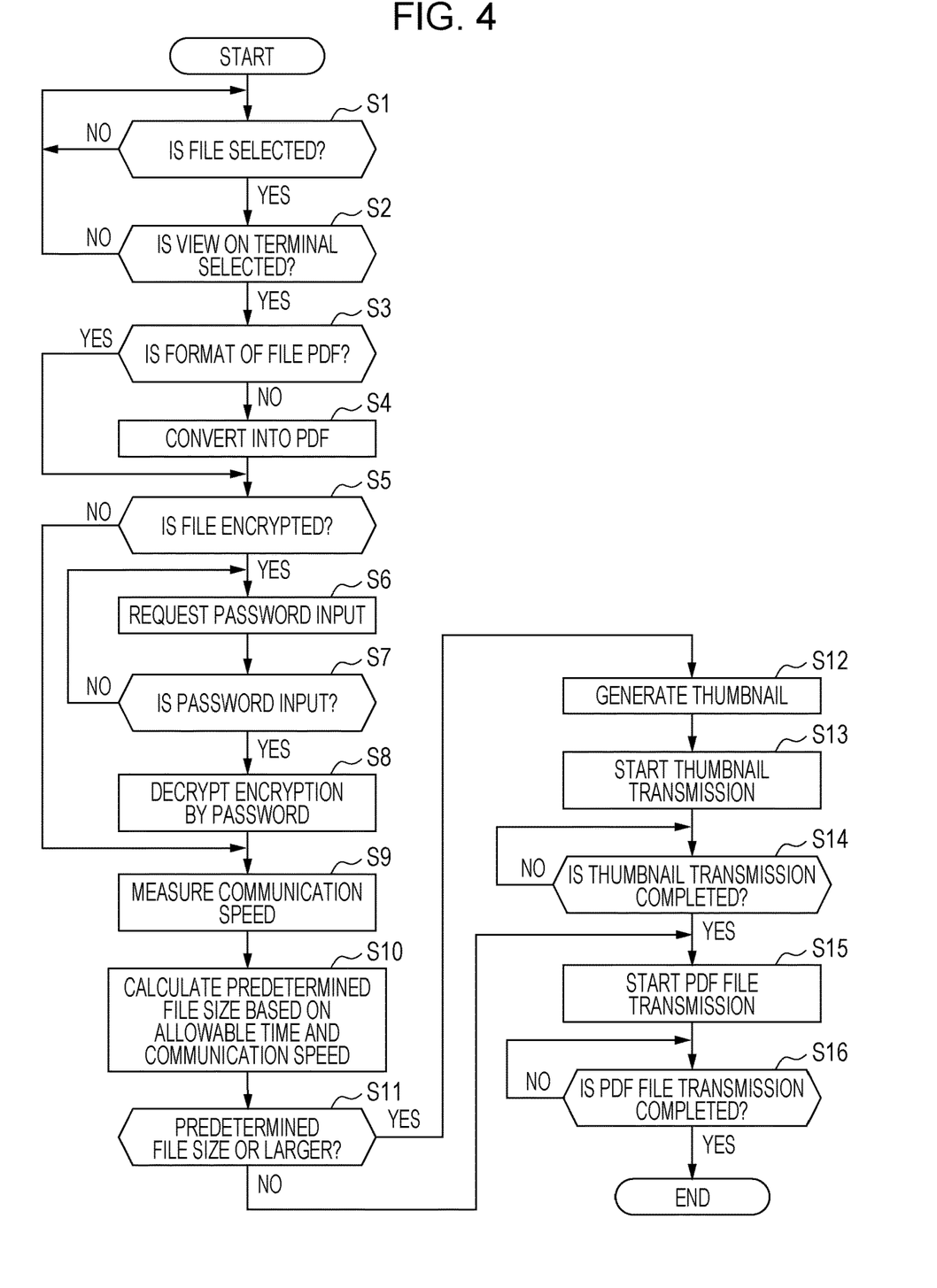
FIG. 4 is a flowchart illustrating an operation of a user PC.

FIG. 4 is a flowchart illustrating the operation by the user PC 100.

The operation by the user PC control section 150 will be described with reference to the flowchart illustrated in FIG. 4.

The user PC control section 150 determines whether or not a user's selection operation for selecting a file has been input (step S1). The user's selection operation is an operation performed by the user to select the file icon 180 displayed at the display section 120 illustrated in FIG. 2. The user PC control section 150 determines whether or not the display position of the cursor 185 overlaps the display position of the file icon 180. When the display position of the cursor 185 overlaps the display position of the file icon 180, the user PC control section 150 determines that the file icon 180 is selected. When the selection operation for selecting the file icon 180 is not accepted (step S1/NO), the user PC control section 150 returns to the determination in step S1, and determines again whether or not the selection operation by the user for selecting the file icon is input.

When the user's selection operation for selecting the file icon 180 is input (step S1/YES), the user PC control section 150 determines whether or not an operation for selecting the item "view on terminal" is accepted by the right click operation on the selected file icon 180 (step S2). When the signal based on the user's operation for selecting the item "view on terminal" is not input (step S2/NO), the user PC control section 150 returns to the determination in step S1.

When the operation signal based on the user's operation for selecting the item "view on terminal" is input (step S2/YES), the user PC control section 150 determines whether the file corresponding to the file icon selected in step S1 is a file in the PDF format or a file in a format other than the PDF format (step 3). When the file format is the PDF format (step S3/YES), the user PC control section 150 proceeds to processing in step S5. When the file format is not the PDF format (step S3/NO), the user PC control section 150 causes the conversion section 172 to convert the file format into the PDF format (step S4).

The user PC control section 150 determines whether or not the file is encrypted (step S5). When the file is not encrypted (step S5/NO), the user PC control section 150 proceeds to processing in step S9. When the file is encrypted (step S5/YES), the user PC control section 150 causes the display section 120 to display an input request for the password of the file (step S6). The user PC control section 150 determines whether or not the password of the file is input (step S7).

When the password of the file is not input (step S7/NO), the user PC control section 150 returns to the processing in step S6. When the password of the file is input (step S7/YES), the user PC control section 150 decrypts the encryption of the file and acquires an unencrypted file in the PDF format (step S8).

The user PC control section 150 measures the communication speed (step S9). The user PC control section 150 measures the communication speed by using the ping command. The user PC control section 150 calculates a predetermined file size based on an allowable time set in advance and the measured communication speed (step S10). Step S10 may be performed before the start of step S1. The user PC control section 150 determines whether or not the file size of the selected file is equal to or larger than the predetermined file size calculated in step S10 (step S11).

When the file size of the selected file is smaller than the predetermined file size calculated in step S10 (step S11/NO), the user PC control section 150 determines that the time equal to or longer than the allowable time is not required to transmit the file, and proceeds to processing in step S15. When the file size of the selected file is equal to or larger than the predetermined file size calculated in step S10 (step S11/YES), the user PC control section 150 determines that it takes time equal to or longer than the allowable time to transmit the file. In this case, the user PC control section 150 generates a thumbnail image data of each page constituting the file (step S12).

The user PC control section 150 starts transmission of the generated thumbnail image data to the server device 300 (step S13). The user PC control section 150 determines whether or not the transmission of the thumbnail image data to the server device 300 is completed (step S14). When the transmission of the thumbnail image data is not completed (step S14/NO), the user PC control section 150 waits until the transmission of the thumbnail image data is completed. When the transmission of the thumbnail image data is completed (step S14/YES), the user PC control section 150 starts the transmission of the file in the PDF format to the server device 300 (step S15). The user PC control section 150 transmits the file in the PDF format and the user ID 167 to the server device 300. The user PC control section 150 determines whether or not the transmission of the file in the PDF format is completed (step S16), and ends the processing flow when the transmission of the file in the PDF format is completed (step S16/YES).

Figure 5:
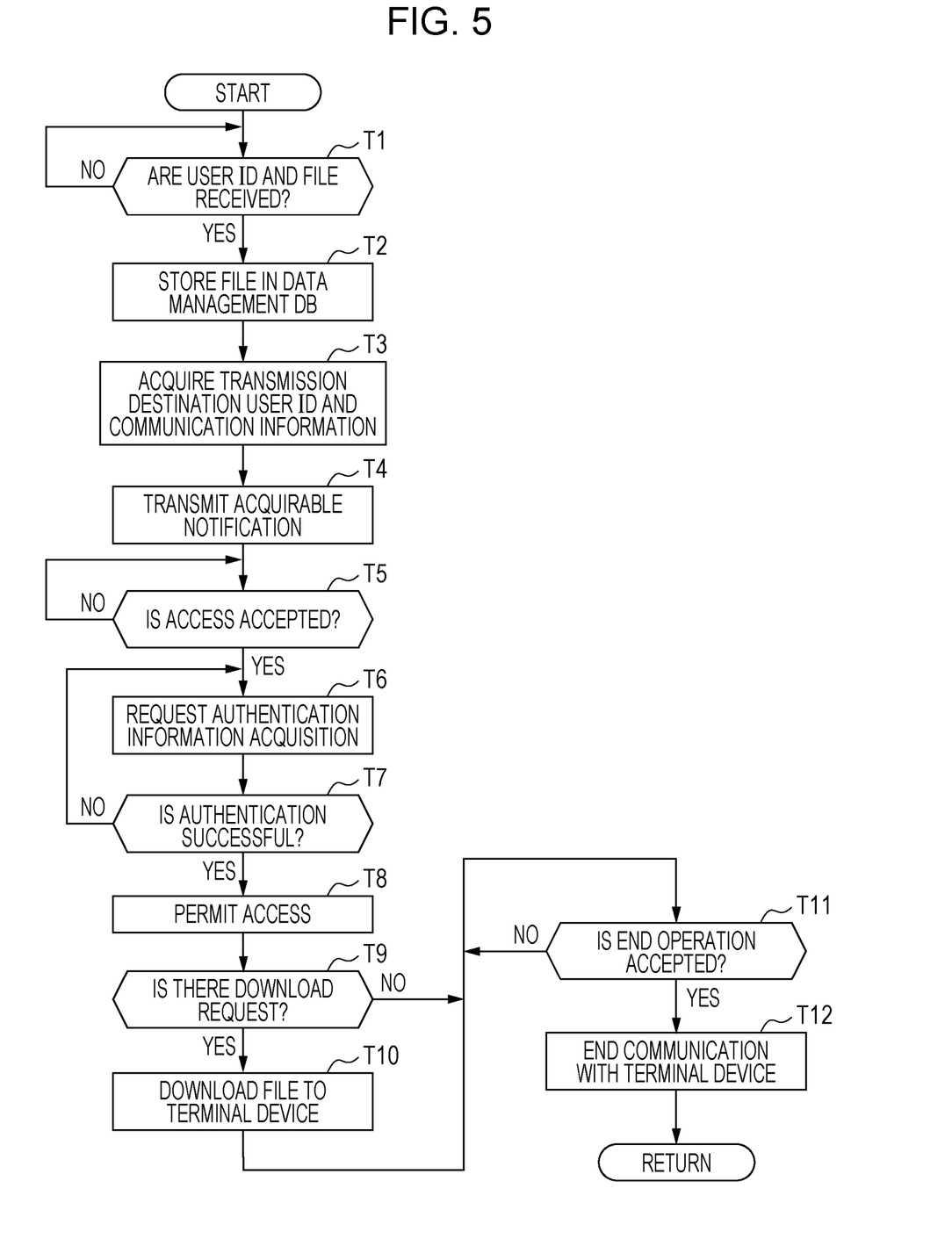
FIG. 5 is a flowchart illustrating an operation of a server device.

FIG. 5 is a flowchart illustrating the operation of the server device 300.

The operation of the server control section 330 will be described with reference to FIG. 5.

The server control section 330 determines whether or not the user ID 167 and the file are received from the user PC 100 (step T1). When the user ID 167 and the file are not received (step T1/N0), the server control section 330 returns to the determination in step T1.

The server control section 330 receives the user ID 167 and the file from the user PC 100 (step T1/YES), and stores the received file in the data management DB 345 (step T2). The server control section 330 sets the user ID 167 received in step T1 as the transmission source user ID, and acquires the transmission destination user ID associated with the transmission source user ID and the communication information from the terminal management DB 343 (step T3).

The server control section 330 acquires the transmission destination user ID and the communication information, and transmits an acquirable notification to the acquired communication information (step T4). The acquirable notification includes a URL indicating the address of the data management DB 345 in which the file is stored.

The server control section 330 determines whether or not an access to the URL notified by the acquirable notification is accepted (step T5). When the access to the URL is accepted (step T5/YES), the server control section 330 transmits an acquisition request of authentication information to the terminal device 200 from which the access has been accepted (step T6).

When the authentication information of the terminal user ID 241 and the password is acquired from the terminal device 200, the server control section 330 performs user authentication based on the acquired authentication information. When the user authentication fails (step T7/N0), the server control section 330 returns to the processing in step T6 and transmits the acquisition request of the authentication information again. When the user authentication is successful (step T7/YES), the server control section 330 permits the access from the terminal device 200 and permits the display of the file on the touch panel 220 of the terminal device 200 (step T8).

The server control section 330 determines whether or not there is a file download request from the terminal device 200 (step T9). When there is no file download request (step T9/N0), the server control section 330 proceeds to a determination in step T11. When there is a file download request (step T9/YES), the server control section 330 transmits the file to the terminal device 200 (step T10).

The server control section 330 determines whether or not an ending operation has been accepted (step T11). When the ending operation is not accepted (step T11/N0), the server control section 330 waits until the ending operation is accepted. When the ending operation is accepted (step T11/YES), the server control section 330 ends the communication with the terminal device 200 (step T12) and returns to the determination in step T1.

As described above, the user PC 100 transmits the file to the server device 300 by setting the terminal device 200 as the transmission destination. The user PC control section 150 serving as a computer included in the user PC 100 executes the printer driver 165 and the control program 161.

In the user PC control section 150, the user PC processor 170 executes the control program 161 and functions as the determination section 171 and the communication control section 173.

When a file is selected, the determination section 171 determines whether the file format of the selected file is PDF.

When it is determined that the file format of the file is PDF, the communication control section 173 transmits the file to the server device 300. When it is determined that the file format of the file is a format different from PDF, the communication control section 173 causes the printer driver 165 to convert the file format of the file into PDF, and transmits the file in the converted PDF format to the server device 300.

Therefore, the user PC control section 150 transmits the file in the PDF format. By fixing the file format as the setting condition, the user PC control section 150 transmits image data in the same format. Therefore, the user does not need to store, in the user PC 100, the format of the data processable by the terminal device 200. When the terminal device 200 receives the data, processing for converting the format of the data is unnecessary.

The user PC control section 150 functions as the conversion section 172. When the determination section 171 determines that the file format is PDF and the file is encrypted, the conversion section 172 converts the file into an unencrypted PDF file in which the encryption has been decrypted.

Therefore, the unencrypted PDF file can be transmitted to the terminal device 200, and the terminal device 200 can display the acquired data as it is.

The user PC control section 150 functions as the decryption section 174. When the data selected by the predetermined operation is encrypted, the decryption section 174 decrypts the encryption of the data.

Therefore, even when the selected data is encrypted, the encryption of the data can be decrypted.

When the password is set in the file, the determination section 171 determines that the file does not satisfy the setting condition.

When the determination section 171 determines that the password is set in the data, the conversion section 172 determines that the file is an encrypted file.

When the size of the file is smaller than the predetermined size and the file format of the file is the first file format, the determination section 171 determines that the file satisfies the setting condition. When the size of the file is equal to or larger than the predetermined size and the file format of the file is the first file format, the determination section 171 determines that the file does not satisfy the setting condition.

When the determination section 171 determines that the file does not satisfy the setting condition, the conversion section 172 executes the printer driver 165 to generate one or more pieces of reduced image data obtained by reducing the size of the data.

The communication control section 173 transmits the reduced image data generated by the conversion section 172 before the file in the PDF format is transmitted.

Therefore, when the size of the file is equal to or larger than the predetermined size, the communication control section 173 generates one or more pieces of reduced image data obtained by reducing the size of the file and transmits the generated reduced image data before transmitting the file, and thus it is possible to reduce the time required for the information processing apparatus to display an image based on the file.

The user PC control section 150 functions as the measurement section 175. The measurement section 175 measures a communication speed of a communication path through which a file is transmitted.

The determination section 171 decides a predetermined size based on the measured communication speed, and determines whether or not the size of the file is larger than the decided predetermined size.

Therefore, the determination section 171 can decide the predetermined size based on the communication speed of the communication path. The determination section 171 can set the data size determined based on the time required for data transmission to the transmission destination as the predetermined size based on the communication speed.

The user PC control section 150 functions as the display control section 176. The display control section 176 causes the display section 120 to display, as an operation on the file icon 180, a display indicating the transmission destination of the file as the context menu 190 in a state where the file icon 180 indicating the file is displayed.

When the input section 130 accepts an operation for selecting the context menu 190 indicating the transmission destination of the file, the user PC control section 150 causes the determination section 171 and the communication control section 173, or the determination section 171, the conversion section 172, and the communication control section 173 to operate.

Therefore, the user can cause the user PC control section 150 to start the processing to transmit the file by selecting the transmission destination of the file displayed as the context menu 190.

When the input section 130 accepts an operation for storing the file in the preset hot folder 169 as a predetermined operation, the user PC control section 150 causes the determination section 171 and the communication control section 173, or the determination section 171, the conversion section 172, and the communication control section 173 to operate.

Therefore, the user can cause the user PC control section 150 to start the processing to transmit the file by performing the operation for storing the file in the hot folder 169.

The above-described embodiment and modified examples illustrate an aspect, and can be optionally modified and applied.

Each section illustrated in FIG. 1 is an example and is not particularly limited. Hardware individually corresponding to each section does not necessarily have to be mounted, and a configuration can of course be adopted in which the function of each section is realized by one processor executing a program. A part of functions realized by software may be realized by hardware, or a part of functions realized by hardware may be realized by software. In addition, a specific detailed configuration of each of other sections of each device in the system 1 can be optionally changed.

When the program is realized by using a computer included in the user PC 100, the program to be executed by this computer can also be configured in a form of a recording medium or a transmission medium that transmits this program. A magnetic or optical recording medium or a semiconductor memory device can be used as the recording medium. Specific examples thereof include portable or fixed recording media such as a flexible disk, a hard disk drive (HDD), compact disc (CD)-ROM, Digital Versatile Disc (DVD), Blu-ray Disc, a magneto-optical disk, a flash memory, and a card-type recording medium. The above-described recording medium may be a non-volatile storage device such as a RAM, ROM, or HDD serving as an internal storage device included in the server. Blu-ray is a registered trademark.

The steps of the operation illustrated in FIG. 4 is divided according to main processing contents in order to facilitate understanding of the operation of each device in the user PC 100, and is not limited by a manner of dividing the processing unit or a name. The processing may be divided into more steps according to the processing contents. Furthermore, one step may be divided so as to include more processes. The order of the steps may be appropriately switched. The same applies to the operation of the server device 300 illustrated in FIG. 5.

What is claimed is:

1. A non-transitory computer-readable storage medium storing a program executed by a computer of a transmission device that transmits a file to a server device with an information processing apparatus set as a transmission destination and that is provided with a printer driver operating therein, the program causing the computer to execute:
   determining, when the file is selected, whether or not a file format of the file selected is a first file format;
   transmitting the file to the server device when it is determined that the file format of the file selected is the first file format; and
   causing, when it is determined that the file format of the file selected is a second file format different from the first file format, the printer driver to convert the file in the second file format into the file in the first file format, and transmitting the file converted in the first file format to the server device, wherein
   when the file is a file in the first file format and a file size of the file is smaller than a predetermined size, the file is transmitted to the server device, and
   when the file is a file in the first file format and a file size of the file is larger than the predetermined size, the file is converted into one or more pieces of reduced image data smaller than the predetermined size, the one or more pieces of the reduced image data are transmitted to the server device, and the file is transmitted to the server device after the one or more pieces of the reduced image data are transmitted.

2. The non-transitory computer-readable storage medium according to claim 1, wherein
   when the file is in the first file format and is encrypted, the file is converted into the file in the first file format unencrypted by decrypting an encryption.

3. The non-transitory computer-readable storage medium according to claim 2, wherein
   when a password is set in the file, it is determined that the file is in the first file format and is encrypted.

4. The non-transitory computer-readable storage medium according to claim 1, wherein
   a communication speed of a communication path through which the file in the first file format is transmitted to the server device is measured, and the predetermined size is decided based on the measured communication speed.

5. The non-transitory computer-readable storage medium according to claim 1, wherein
   a file icon indicating the file is displayed at a display section included in the transmission device,
   a menu including an item indicating processing for the file is displayed when a predetermined operation is performed on the file icon by a user, and
   it is determined that the file is selected when the item is selected.

6. The non-transitory computer-readable storage medium according to claim 1, wherein
   a hot folder is set in advance, and
   it is determined that the file is selected when the file is stored in the hot folder.

7. The non-transitory computer-readable storage medium according to claim 1, wherein
   the first file format is a PDF format.

8. A transmission device that transmits a file to a server device with an information processing apparatus set as a transmission destination and that is provided with a printer driver operating therein, the transmission device comprising:
   an acceptance section configured to receive an operation signal indicating that the file is selected;
   a determination section configured to determine whether or not a file format of the file selected is a first file format;
   a conversion section configured to convert, when the determination section determines that the file format of the file is a second file format different from the first file format, the file in the second file format into the file in the first file format; and
   a communication control section configured to transmit, when the determination section determines that the file is in the first file format, the file and information on the transmission destination to the server device, and transmit, when the determination section determines that the file format of the file is the second file format, the file converted in the first file format and the information on the transmission destination to the server device, wherein
   when the file is a file in the first file format and a file size of the file is smaller than a predetermined size, the communication control section transmits the file to the server device, and
   when the file is a file in the first file format and a file size of the file is larger than the predetermined size, the conversion section converts the file into one or more pieces of reduced image data smaller than the predetermined size, and the communication control section transmits the one or more pieces of the reduced image data to the server device and transmits the file to the server device after transmitting the one or more pieces of the reduced image data.

9. The transmission device according to claim 8, further comprising:
   a display section; and
   a display control section configured to generate a menu including an item indicating an instruction for transmitting the file to the transmission destination, and display the menu at the display section, wherein
   the acceptance section receives the operation signal when the item included in the menu is selected by an operation of a user.

10. The transmission device according to claim 8, wherein
    when the file is in the first file format and is encrypted, the conversion section converts the file into the file in the first file format unencrypted by decrypting an encryption.

11. The transmission device according to claim 10, wherein
    when a password is set in the file, the determination section determines that the file is in the first file format and is encrypted.

12. The transmission device according to claim 8, wherein
    the determination section measures a communication speed of a communication path through which the file in the first file format is transmitted to the server device, and decides the predetermined size based on the measured communication speed.

13. The transmission device according to claim 8, further comprising:

a storage section configured to store a hot folder, wherein the determination section determines that the file is selected when the file is stored in the hot folder.

14. The transmission device according to claim 8, wherein the first file format is a PDF format.

\* \* \* \* \*